(12) United States Patent
Nilsson et al.

(10) Patent No.: US 8,063,648 B2
(45) Date of Patent: Nov. 22, 2011

(54) METHOD AND DEVICE FOR DEMODULATION OF SIGNALS

(75) Inventors: Jan Nilsson, Västerås (SE); Jarl R. Sobel, Västerås (SE)

(73) Assignee: ABB AB, Västerås (SE)

( * ) Notice: Subject to any disclaimer, the term of this patent is extended or adjusted under 35 U.S.C. 154(b) by 34 days.

(21) Appl. No.: 12/308,080

(22) PCT Filed: May 10, 2007

(86) PCT No.: PCT/SE2007/050326
§ 371 (c)(1),
(2), (4) Date: Nov. 13, 2009

(87) PCT Pub. No.: WO2007/142591
PCT Pub. Date: Dec. 13, 2007

(65) Prior Publication Data
US 2010/0109766 A1    May 6, 2010

(30) Foreign Application Priority Data
Jun. 7, 2006 (SE) .................. 0601249

(51) Int. Cl.
G01R 27/00 (2006.01)
G01R 27/02 (2006.01)
G01R 27/28 (2006.01)
G01R 27/30 (2006.01)

(52) U.S. Cl. ......... 324/608; 324/603; 324/607; 324/650

(58) Field of Classification Search .......... 324/600, 324/602, 603, 605, 607, 608, 649, 650; 329/347; 331/65, 66
See application file for complete search history.

(56) References Cited

U.S. PATENT DOCUMENTS
5,631,553 A    5/1997   Bose et al.
6,285,719 B1 *  9/2001   Sobel ............................ 375/259
2004/0243329 A1  12/2004  Seki FOREIGN PATENT DOCUMENTS
EP    0536065    4/1993
GB    2411481    8/2005
WO    00/60326   10/2000

* cited by examiner

Primary Examiner — David Mis
(74) Attorney, Agent, or Firm — Dilworth & Barress, L.L.P.

(57) ABSTRACT

A method and device are provided for demodulation of an output signal from a transducer (1) driven by an alternating excitation signal having an excitation frequency. The transducer produces an amplitude-modulated output signal (y(t)) containing the quantity to be measured. The device has sampling units (5,6,7) to sample the output signal from the transducer and the output signal from the excitation unit, and a computation unit (8) to compute a first complex valued quantity ($\overline{Y}$) including information on the amplitude and phase of the output signal at the excitation frequency based on sampled values of the output signal from the transducer, compute a second complex valued quantity ($\overline{U}$, $\overline{I}$) including information on the amplitude and phase of the excitation signal at the excitation frequency based on sampled values of the excitation signal, forming a complex valued output quotient between the first and second complex valued quantities, and compute the demodulated output signal ($O_d$) based on the output quotient.

20 Claims, 1 Drawing Sheet

METHOD AND DEVICE FOR DEMODULATION OF SIGNALS

FIELD OF THE INVENTION

The present invention relates to a device and a method for demodulating an output signal from a transducer driven by an alternating excitation signal having an excitation frequency, which transducer produces an amplitude modulated output signal containing the quantity to be measured.

The present invention is useful for any type of measuring device including a transducer, which produces an amplitude-modulated output signal containing a quantity to be measured, and an excitation unit, which produces an excitation signal for driving the transducer. The transducer is, for example, a differential transformer, a magnetoelastic sensor, or a strain gauge, and the quantity to be measured is, for example, position, stress, force, or torque.

PRIOR ART

In order to detect the measured quantity, the output signal from the transducer has to be demodulated. The traditional way to demodulate the output signal of a transducer, for example a magnetoelastic transducer, is to use analogue phase sensitive detection. Phase sensitive detection is a well-known method for the demodulation or rectification of an AC signal by a circuit that is controlled by a reference waveform derived from the device causing the signal which is modulated by the transducer.

Another method is described by U.S. Pat. No. 6,285,719, where the rectification and filtering are performed digitally by sampling the transducer output signal, synchronously with the generation of the excitation voltage. The rectification and filtering are performed by summing the samples gathered over each half period. A half period average corresponding to a negative half period of the excitation is then multiplied by minus one. The role of the above reference waveform is played by the clock controlling the generation of the excitation signal and the sampling of the output.

U.S. Pat. No. 6,285,719 also describes a method to emulate a given analogue system for phase sensitive detection by computing a weighted average of the sampled output, using a weighting function derived from the input filter of the analogue device to be emulated.

Several forms of load/force/pressure transducers are known which utilize magnetoelastic materials.

Some magnetoelastic transducers are of the type having a single electrical coil which is excited by a periodically changing voltage waveform of constant magnitude, provided from a low-impedance source, and from which a force-measuring output is obtained by monitoring the single coil current. Other magnetoelastic transducers may have a pair of separate coils, with a constant current excitation being applied to the first coil and the transducer response being measured by the magnitude of an output voltage produced across the second coil.

Magnetoelastic transducers use the magnetoelastic property of ferromagnetic substances in order to detect a change in the mechanical stresses in a measuring zone. This change of mechanical stress is caused by an outer load (force, pressure or torque) acting on the transducer, and the output signal of the transducer is a measure of this load.

The operation of a magnetoelastic transducer is similar to that of a differential transformer in that it consists of a primary and a secondary winding. The primary winding is excited with an AC signal, and the measured quantity changes the magnetic coupling between the primary and secondary windings. The load on a magnetoelastic transducer thus causes a modulation of the amplitude of the secondary signal, i.e. the output signal of the transducer. The fundamental frequency of the output is equal to the frequency of the primary voltage, i.e. the excitation voltage.

In order to measure the load, the amplitude-modulated output signal needs to be demodulated. In order to achieve good stability of the output, the transducer is designed in such a way that zero load yields an amplitude of the output which is close to zero. In order to distinguish between positive and negative loads, and to get good linearity of the output, phase sensitive detection or synchronous demodulation must be used.

The methods for demodulation of the output signal used in the prior art have three main difficulties that need be resolved.

Since the transducer yields a modulation of the amplitude of the excitation signal, it is very important that the excitation is kept at a constant level, i.e. at constant amplitude. If the level of excitation changes, the sensitivity of the transducer will change by the same amount. Furthermore, the harmonic content of the excitation is important, since different harmonics of the output signal will yield different contributions to the rectified output.

This can be particularly difficult with magnetoelastic load cells, since their impedance is nonlinear and changes with the mechanical load on the transducer.

Secondly, in all systems, the output signal of transducers is amplified and filtered by an input filter. In a magnetoelastic transducer harmonics are generated by the nonlinearities of the ferromagnetic material, and these harmonics have a significant contribution to the rectified output. The frequency response of the input filter must therefore be well determined both in amplitude and phase over a wide range of frequencies. This puts high demand on the electronics of the excitation unit, and thus makes it expensive.

A third difficulty in using phase sensitive detection is how to derive the reference waveform, which controls the rectifier, from the excitation signal.

In the analogue system where zero crossing detection is used, noise affecting this detection will yield low frequency noise in the rectified output.

In the case of digital sampling, rectification and filtering, the reference waveform and the excitation signal are derived from a common clock. An analogue controller, which regulates the phase of the excitation current with respect to the clock signal, is therefore needed.

Another problem is connected to the output impedance of the transducer. In a magnetoelastic transducer this impedance is highly inductive. The input impedance of the input channel is usually capacitive, in order to comply with the EMC directive. Thus, if the excitation signal contains high frequencies, the resonance between the inductance of the transducer and the capacitance of the input will become excited, which will affect the demodulated output. To avoid this problem, sinusoidal excitation signals are commonly used, instead of using a switched DC voltage, which would reduce the power losses in the electronics unit.

OBJECTS AND SUMMARY OF THE INVENTION

The object of the present invention is to provide an improved demodulation of the output signal from the transducer, which alleviates the problems mentioned above.

According to one aspect of the invention, this object is achieved with the method as described herein.

The method comprises: receiving sampled values of the output signal from the transducer and sampled values of the excitation signal over at least one period of the excitation frequency, computing a first complex valued quantity including information on the amplitude and phase of the output signal at the excitation frequency based on the sampled values of the output signal from the transducer, computing a second complex valued quantity including information on the amplitude and phase of the excitation signal at the excitation frequency based on the sampled values of the excitation signal, forming a complex valued output quotient between the first and second complex valued quantities, and computing the demodulated output signal based on the output quotient. The sampled values of the excitation signal can represent either the magnitude of the current or the voltage of the excitation signal.

Due to the fact that the demodulation is carried out based on a quotient between a first and a second complex valued quantity including information on the amplitude and phase of the output signal and information on the amplitude and phase of the excitation signal, the demodulation becomes independent of changes in amplitude and phase of the excitation signal. Thus, the demodulation does no longer require an excitation signal with constant amplitude and phase. Nor does it require that the harmonic content of the excitation signal is constant in amplitude or phase, and is therefore uninfluenced by external factors such as the cable impedance, or the temperature of the electronics or the transducer. This allows the use of cheap electronics, such as a simple switch forming a square wave from a DC voltage, for the excitation unit. Thereby, the cost of the sensor is reduced.

Due to the fact that the complex valued quantities include information on the amplitude and phase at the excitation frequency, which is the fundamental tone of the excitation signal, the influence of all harmonics in the transducer signal is eliminated. The input filter of the electronics need therefore only be well determined at the excitation frequency and not for a wide range of frequencies as in the prior art systems.

The need to derive a reference signal from the excitation frequency is also eliminated. In a way, the excitation signal itself is used as a reference signal in the demodulation. Any change of phase of the excitation signal is perfectly compensated for.

According to an embodiment of the invention, the computation of the demodulated output signal comprises taking the real part of the output quotient. Normally the reference phases (the arbitrary phase defined as zero) of the two complex quantities are selected so that their resulting quotient has mainly a real part. In this way we obtain the highest possible dynamics of a digital system with limited resolution, and this is thus the preferred embodiment. In principle, the information about the demodulated output signal is present in all components of the complex quotient, but the dynamics decrease as we deviate from the optimum.

According to another embodiment of the invention, the computation of the demodulated output signal comprises forming a nonlinear combination of the real and imaginary parts of the output quotient. This is the nonlinear extension of the previous embodiment, and may be required if the output of the transducer behaves nonlinearly with the quantity to be measured.

According to an embodiment of the invention, the computation of the first quantity comprises multiplying the sampled values of the output signal with a sinusoid oscillating at the excitation frequency, and summing the resulting products over at least one period of the excitation signal, thereby forming a real part of the first quantity, and multiplying the sampled values of the output signal with another sinusoid displaced by a phase angle of approximately $\pi/2$ with respect to the first sinusoid and oscillating at the excitation frequency, and summing the resulting products over at least one period of the excitation signal, thereby forming an imaginary part of the first quantity. According to this embodiment, the real and imaginary parts of the fundamental tone of the output signal are computed.

Further, the computation of the second quantity comprises multiplying the sampled values of the excitation signal by a sinusoid oscillating at the excitation frequency, and summing the resulting products over at least one period of the excitation signal, thereby forming a real part of the second quantity, and multiplying the sampled values of the excitation signal by another sinusoid displaced by a phase angle of approximately $\pi/2$ with respect to the first sinusoid and oscillating at the excitation frequency, and summing the resulting products over at least one period of the excitation signal, thereby forming an imaginary part of the second quantity. According to this embodiment, the real and imaginary parts of the fundamental tone of the excitation signal are computed.

Preferably, sampled values of the sinusoids are calculated and stored beforehand. The sinusoids may have an arbitrary phase position relative the excitation signal. Preferably, the phase position of the sinusoids relative the output signal and the excitation signal are chosen such that one of the parts of the quantity becomes zero, for example the imaginary part of the quantity. This embodiment of the invention is easy to implement and does not require much computer capacity.

According to an alternative embodiment of the invention, the computation of the first quantity comprises calculating the Fourier transform of the sampled values of the output signal, and based thereon extracting a coefficient corresponding to the excitation frequency, and the computation of the second quantity comprises calculating the Fourier Transform of the sampled values of the excitation signal, and based thereon extracting a coefficient corresponding to the excitation frequency. Using the Fourier Transform for computation of the complex valued quantities is mathematically equivalent to the above-described method using a sinusoid oscillating at the excitation frequency.

According to an embodiment of the invention, the sampled values of the excitation signal includes a first series of sampled values representing the current of excitation signal and a second series of sampled values representing the voltage of the excitation signal, and the method further comprising computing the second complex valued quantity based on one of the series of sampled values, computing a third complex valued quantity including information on the amplitude and phase of the excitation current based on the other of the series of sampled values, forming a complex valued quotient between the second and third complex valued quantities, computing the impedance of the transducer based on the complex valued quotient between the excitation voltage and the current, and performing a temperature compensation based on the computed impedance.

Since the impedance of the transducer varies with the temperature, this may be used for temperature compensation. The impedance is calculated based on a quotient between the excitation voltage and the excitation current, and the calculated impedance is used as a measure of the temperature. According to this embodiment of the invention, the temperature compensation is performed based on the computed impedance. It is possible to compensate for zero drift as well as for changes in measuring sensitivity due to temperature changes. Zero drift is changes in the output signal from an unloaded transducer, or a transducer in a rest position, due to temperature changes. For example, when computing the output signal of the transducer, a temperature-dependent zero signal can be subtracted from the demodulated output signal in order to compensate for the zero drift, and the demodulated output signal can be multiplied by a temperature-dependent scaling factor in order to compensate for changes in the measuring sensitivity due to temperature changes, thus eliminating the dependence on transducer temperature of the output signal.

The method according to the invention, is suitable for execution by a computer program having instructions corresponding to the steps in the inventive method when run on a processor unit. It is also advantageous to carry out at least some of the computations by means of an FPGA.

According to a further aspect of the invention, the object is achieved by a computer program product directly loadable into the internal memory of a computer or a processor, comprising software code portions for performing the steps of the method, when the program is run on a computer. The computer program is provided either on a computer-readable medium or through a network.

According to another aspect of the invention, the object is achieved by a computer readable medium having a program recorded thereon, when the program is to make a computer perform the steps of the method, and the program is run on the computer.

According to another aspect of the invention this object is achieved by a device as described herein. Such a device comprises a sampling unit adapted to sample the output signal from the transducer and the output signal from the excitation signal over at least one period of the excitation frequency, and a computation unit adapted to compute a first complex valued quantity including information on the amplitude and phase of the output signal at the excitation frequency based on sampled values of the output signal from the transducer, compute a second complex valued quantity including information on the amplitude and phase of the excitation signal at the excitation frequency based on sampled values of the excitation signal, forming a complex valued output quotient between the first and second complex valued quantities, and compute the demodulated output signal based on the output quotient. In an analog system, it is necessary to keep the excitation signal at a constant level. In the suggested device for demodulation this is no longer necessary for a transducer which behaves linearly.

Further developments of the device are characterized by the features additionally described herein.

The invention is, for example, useful for demodulating a transducer adapted to measure force, stress or torque. The invention is particularly useful for demodulating a magnetoelastic transducer. In the case of a magnetoelastic transducer, a large degree of compensation for small variations is obtained. Changes in the shape of the excitation due to changes in the excitation electronics circuitry, the cable, or the transducer impedance are compensated for.

BRIEF DESCRIPTION OF THE DRAWINGS

The invention will now be explained more closely by the description of different embodiments of the invention and with reference to the appended figures.

DETAILED DESCRIPTION OF PREFERRED EMBODIMENTS OF THE INVENTION

Figure 1:
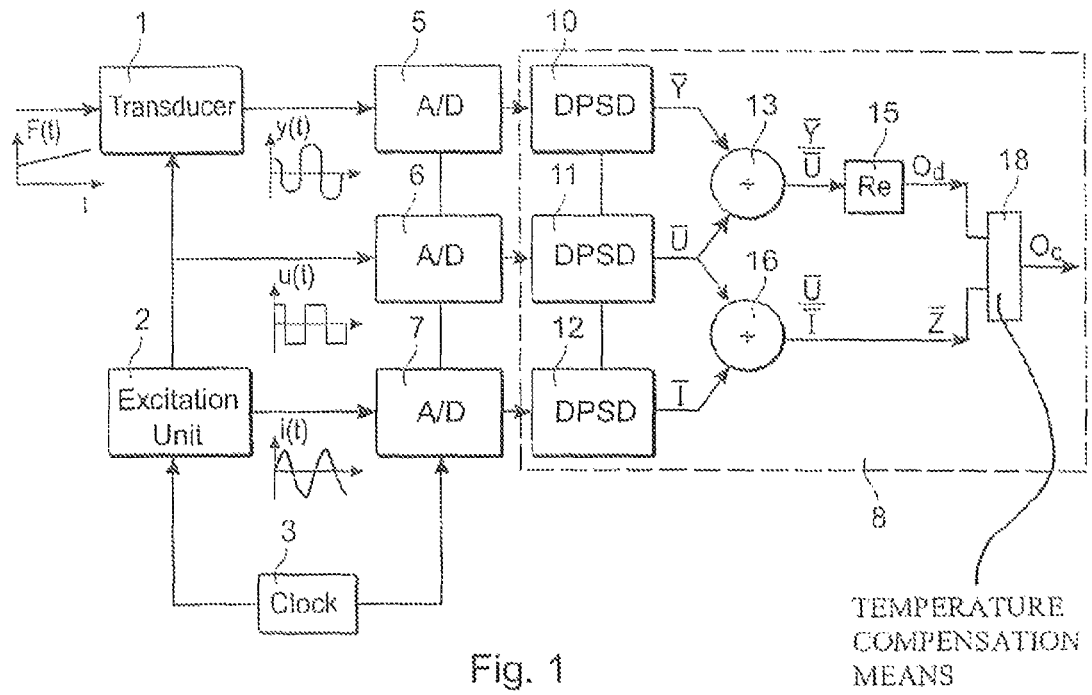
FIG. 1 shows a device for demodulation of an output signal from a transducer according to an embodiment of the invention.

FIG. 1 illustrates a device for demodulation of an output signal y(t) from a transducer 1 driven by an excitation signal, in the form of a periodic excitation voltage u(t), from an excitation unit 2. For example, the transducer is a magnetoelastic transducer measuring changes in applied force. A time-dependent force F(t) is applied to the transducer 1, which is excited by the excitation voltage u(t) from the excitation unit 2. In FIG. 1 the excitation voltage is depicted as a square wave u(t). The transducer 1 modifies the excitation voltage in dependence on the magnitude of the force F(t), and produces a transducer output signal y(t). The excitation current i(t) is measured by the excitation unit 2. A clock 3 determines the excitation frequency of the excitation unit 2.

The device comprises a first sampling unit 5 adapted to sample the output signal y(t) from the transducer 1, a second sampling unit 6 adapted to sample the excitation voltage u(t) of the excitation unit, and a third sampling unit 7 adapted to sample the excitation current i(t). The sampling units 5-7 are A/D-converters. The excitation unit 2 and the sampling units 5-7 are connected to and synchronized by a common clock 3. Thus, the sampling frequency is fixed in relation to the excitation frequency. The signals y(t), u(t) and i(t) are sampled by the A/D converters 5-7. Each signal y(t), u(t) and i(t) is normally sampled N times during a period of the excitation voltage. In general, and especially if the excitation frequency is much higher than the characteristic frequency of the quantity to be measured, it is also possible to sample the signals N times in M periods, where N and M are whole numbers, preferably without common factors.

Instead of all signals being connected to different sampling units 5-7, it is also possible to apply all signals to a common sampling unit by the use of a multiplexer.

The device further comprises a computation unit 8 adapted to compute a demodulated output signal $O_d$ and the impedance $Z_T$ of the transducer. The computation unit 8 includes means 10 for computing a first complex valued quantity $\overline{Y}$ including information on the amplitude and phase of the output voltage at the excitation frequency, means 11 for computing a second complex valued quantity $\overline{U}$ including information on the amplitude and phase of the excitation voltage at the excitation frequency, and means 12 for computing a third complex valued quantity $\overline{I}$ including information on the amplitude and phase of the excitation current at the excitation frequency. The computation unit further comprises means 13 for computing a complex valued output quotient $\overline{Y}/\overline{U}$ between the first and second complex valued quantities, and means 15 for computing the real part of the quotient. Thus, the output signal $O_d$ is obtained by forming the quotient of the demodulated transducer signal $\overline{Y}$ and the demodulated excitation voltage $\overline{U}$, and then taking the real part of the resulting complex number.

The computation unit 8 further comprises means 16 for computing a complex valued output quotient $\overline{U}/\overline{I}$ between the second and third complex valued quantities. The quotient between the demodulated excitation voltage $\overline{U}$, and the demodulated excitation current $\overline{I}$ is formed, and yields a measure of the complex transducer impedance $\overline{Z}$. If this impedance is dependent upon the load or the temperature, it can be used for linearization or temperature compensation of the output signal.

The computation unit 8 further comprises means 18 for performing a temperature compensation of the output signal $O_d$ based on the computed impedance $\overline{Z}$. The temperature of the transducer is calculated based on the impedance $\overline{Z}$, for example by taking the real part of the complex valued impedance. It is possible to select which information the real part of the computed impedance should contain in dependence on which phase position is selected for the excitation signal. For example, the temperature compensation of the output signal includes subtracting a temperature-dependent, predetermined zero signal from the output signal $O_d$ in order to compensate for the zero drift, and multiplying the output signal $O_d$ with a temperature-dependent, predetermined scaling factor in order to compensate for changes in the measuring sensitivity due to temperature changes. The zero signal and the scaling factor to be used for the temperature compensation is determined based on the calculated temperature. The final temperature-compensated demodulated output signal is denoted $O_c$.

Figure 2:
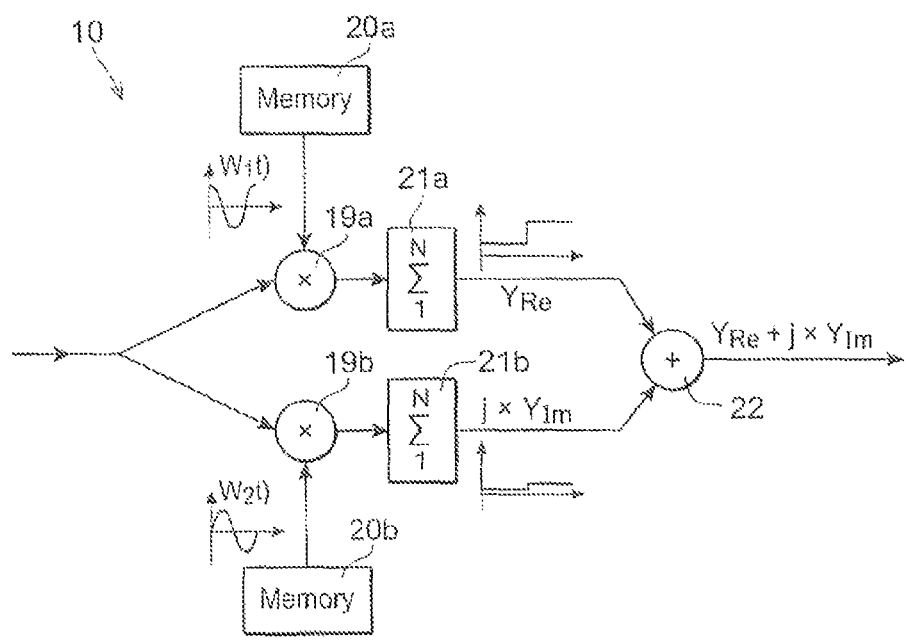
FIG. 2 shows an example of computation of a complex valued quantity including information on amplitude and phase of the input signal.

FIG. 2 shows the principle of means 10 for computing the complex valued quantity $\overline{Y}$ according to an embodiment of the invention. The means 11, 12 for computing the complex valued quantities $\overline{U}$ and $\overline{I}$ use the same principle as shown in FIG. 2. The means 10, 11, 12 are denoted digital phase sensitive detectors with complex valued outputs (DPSD). Input to the DPSD is sampled voltage or current values. The phase sensitive detector 10-12 demodulates the input signal, and yields a digital output in the form of a complex number every period (or half-period) of the excitation signal.

The N samples of the input signal $\overline{Y}$ are multiplied 19a by the corresponding N samples of a first weight function $w_1(t)$ stored in a memory 20a, and the results are summed 21a. The sum is interpreted as the real part $Y_{Re}$ of the complex valued quantity $\overline{Y}$. The samples of the input signal are also multiplied 19b by the corresponding N samples of a second weight function $w_2(t)$, stored in a memory 20b, or obtained by shifting the samples of the weight function $w_1(t)$ by N/4 steps, and these results are also summed 21b. This sum is interpreted as the imaginary part $Y_{Im}$ of the complex valued quantity Y. Preferably, the first weight function $w_1(t)$ is a sinusoidal signal alternating with the excitation frequency, and the second weight function $w_2(t)$ is a cosine-shaped signal alternating with the excitation frequency. The sum of the N samples of each of the weight functions should be equal to zero, so that an overlaid DC-signal does not contribute to the demodulated output. The output $\overline{Y}=Y_{Re}+jY_{Im}$ from the DPSD, i.e. the complex valued quantity $\overline{Y}$, is computed as the sum 22 of the computed real and the imaginary parts. The complex quantity $\overline{Y}$ includes information on the amplitude $A_Y$ and phase $\Phi_Y$ according to the following relationships:

$$A_Y = \sqrt{Y_{Re}^2 + Y_{Im}^2}$$

$$\Phi_Y = \arctan(Y_{Im}/Y_{Re})$$

In the same way, the complex quantities $\overline{U}$ and $\overline{I}$ also include information on the amplitude and phase of the sampled signals u(t) and i(t).

The principle of the demodulation according to the invention is similar to the concept of the frequency response. The frequency response is a representation of a linear time-invariant system's response to sinusoidal inputs at varying frequencies. The output of a linear system to a sinusoidal input is a sinusoid of the same frequency but with a different magnitude and phase.

In the following another embodiment of the invention will be described in more detail. The frequency response is defined as the magnitude and phase differences between the input and output sinusoids, and is usually described mathematically using a function of complex numbers $H(j\omega)$. This function is usually formed by computing the quotient between the Fourier Transform of the output signal $Y(j\omega)$ divided by the Fourier Transform of the input signal $X(j\omega)$, where $\omega$ is the angular frequency of the signals.

$$H(j\omega) \equiv \frac{Y(j\omega)}{X(j\omega)} \quad (1)$$

A magnetoelastic transducer is neither time invariant nor linear, but for a single frequency $\omega_0$ it is still meaningful to compute the amplitude and phase of the input and output signal, at a certain time, t, and form the quotient:

$$H(t, \omega_0) \equiv \frac{Y(t, j\omega_0)}{X(t, j\omega_0)} \quad (2)$$

The frequency $\omega_0$ is chosen to be the excitation frequency $\omega_0 = 2\pi f_0$ and the value of the quotient is computed from values sampled over one or several periods of the excitation frequency. The demodulated output of the transducer is then formed by taking a linear combination of the real and imaginary parts of this complex number, or equivalently multiplying the quotient by a given complex number and taking the real part of the result:

$$U(t) = Re(e^{j\alpha} H(t, j\omega_0)) \quad (3)$$

In this case, the input signal does not need to be sinusoidal. The expression (2) above simply states that we shall compute the amplitude and phase of the Fourier component of the input signal at the excitation frequency.

The same reasoning holds for the output signal of the transducer. In order to compute the Fourier component of a signal, the definition of the Discrete Fourier Transform is used. Consider a signal x(t), sampled N times with intervals $\tau$ between samples, so that sample $x_n \equiv x(n\tau)$. The Discrete Fourier Transform form of this list of samples can be defined as:

$$X(k) \equiv \frac{1}{\sqrt{N}} \sum X \quad (4)$$

Now, considering the simplest case, where the transducer signal is sampled over one period of the excitation frequency, T. In this case:

$$N\tau = T = \frac{2\pi}{\omega_0} \quad (5)$$

so that equation (4) can be written:

$$X(k) \equiv \frac{1}{\sqrt{N}} \sum_{n=0}^{N-1} x_n e^{jk\omega_0 n\tau} \quad (6)$$

X(k) represents the Fourier component of the k'th harmonic. The Fourier component of the signal at the excitation frequency is therefore given by the above equation with k=1. The factor $1\sqrt{N}$ is simply a normalization factor without importance when computing the quotient according to (2), so for the purpose of signal demodulation according to the invention, $$X(t, j\omega_0) \equiv \sum_{n=0}^{N-1} x_n(t)e^{j\omega_0 n\tau} \tag{7}$$

The time dependence is here included in the list of sampled values $x_n(t)$, since this list of N samples is updated in real time at some discrete time interval.

$$x_n(t) = x(t-(N-n)\tau) \tag{8}$$

Finally, the output signal according to the invention is obtained from the excitation signal, x(t), and the amplitude modulated output signal of the transducer, y(t), according to:

$$U(t) = \text{Re}\left(e^{j\alpha} \frac{\sum_{n=0}^{N-1} y_n(t)e^{j\omega_0 n\tau}}{\sum_{n=0}^{N-1} x_n(t)e^{j\omega_0 n\tau}}\right) \tag{9}$$

In a practical application, the lists of sampled values $x_n(t)$, and $y_n(t)$ will be updated each time a new complete list of samples is obtained. In the above example, where the transducer signal is sampled over one period of the excitation frequency, the output signal U(t) will only be computed and updated with the same period as the excitation signal.

The choice of the angle a above corresponds to the choice of the difference in phase between the reference signal of the phase sensitive detection, and the excitation signal. It is usually selected to maximize the demodulated sensitivity of the transducer.

The computation described by the equation (9) requires the use of some Arithmetic Logical Unit, ALU, but it can be implemented in either the digital circuitry of an FPGA, an ASIC, or a simple microprocessor.

In practice the computation of each Fourier component can be implemented using real numbers, or even in integer arithmetic using known methods. For example, the Fourier component of the excitation signal can be computed by computing two sums:

$$X(t, j\omega_0) \equiv X_{Re}(t, j\omega_0) + jX_{Im}(t, j\omega_0) \tag{10}$$

$$\equiv \sum_{n=0}^{N-1} x_n(t)\cos(j\omega_0 n\tau) + j\sum_{n=0}^{N-1} x_n(t)\sin(j\omega_0 n\tau)$$

A difference from the demodulation according to the invention and U.S. Pat. No. 6,285,719 is thus that both the excitation signal and the output signals are measured, and that for each sequence of sampled values, two sums are computed, using different weight functions. The results of these four sums are then combined to form the demodulated output in a way described by (9). In U.S. Pat. No. 6,285,719, only one sum is computed from the sequence of sampled output signals, and this sum is used directly as the demodulated output, possibly after some digital filtering.

The multiplication by the factor $e^{j\alpha}$ in (9) can for simplicity be incorporated with the weight functions using known mathematical identities. For example, to this end we can rewrite the Fourier component of the output signal as:

$$Y(t, j\omega_0) \equiv Y_{Re}(t, j\omega_0) + jY_{Im}(t, j\omega_0) \tag{11}$$

$$\equiv \sum_{n=0}^{N-1} y_n(t)\cos(j\omega_0 n\tau + j\alpha) +$$

$$j\sum_{n=0}^{N-1} y_n(t)\sin(j\omega_0 n\tau + j\alpha)$$

The weight functions only depend on the sampling interval, and the angle $\alpha$. These parameters are usually kept constant for a given magnetoelastic transducer, so the weight function can be computed in advance and stored in a memory.

If the number of samples is even, only the values of the weight function for one half period need to be stored. If the number of samples is odd, different weight functions for the two half periods may be necessary.

For a linear system, the demodulation is independent of the curve shape of the excitation. For a magnetoelastic transducer, the curve shape will surely have an influence, but small changes in the curve shape are effectively compensated for.

An excitation signal, which contains high frequencies, such as a square wave, may cause the excitation of a resonance in the secondary circuit. The fact that the demodulation only takes into account the properties at the excitation frequency makes it uninfluenced by the resonance.

This makes the proposed demodulation especially suited for systems where the AC excitation voltage is formed by the switching of a DC voltage using known techniques.

Normally, an electronics unit would collect samples for one period of the excitation signal, and update the output with the frequency of the excitation signal. In order to double the update frequency, it is possible to collect samples for each half period and update the output at this rate. The demodulated output should still be based on samples from a whole period in order to suppress the contribution from a possible overlaid DC-signal.

The excitation signal can be chosen either as the excitation current or the excitation voltage. The advantage by choosing the current as the excitation signal is that this can be measured internally in the electronics unit. Measuring the excitation voltage usually requires the use of an extra pair of wires in the cable, so that the voltage can be measured at the transducer. If the cable is fixed without connectors, and has negligible impedance compared with the transducer this is not necessary. The choice of the current as the excitation signal makes it possible to connect several transducers in series, since their current is the same.

The disadvantage of the current is that it requires a current shunt or a transformer to measure the current. Such a device is costly and yields an additional source of errors in the demodulated transducer output.

The complex demodulated output using the current as the excitation signal, U(t), can be computed in terms of the demodulated output using the voltage as the excitation signal (U(t, jω) according to:

$$\overline{U}_i(t) = \frac{Y(t, j\omega_0)}{I(t, j\omega_0)} \tag{12}$$

$$= \frac{Y(t, j\omega_0)}{U(t, j\omega_0)} \times \frac{U(t, j\omega_0)}{I(t, j\omega_0)}$$

$$= \overline{U}_u(t) \times Z(t, j\omega_0)$$

where $Z(t,j\omega_0)$ is the Fourier component of the complex impedance of the transducer. The definition of the other Fourier components such as $I(t,j\omega_0)$ is given by (7) above.

The real demodulated output is obtained by taking the real part of the complex output after multiplication by $e^{j\alpha}$.

Since the impedance of the transducer is temperature-dependent, the choice of excitation signal also affects the uncompensated temperature drift of the sensitivity of the transducer. The impedance of the transducer may also depend on the load. In this case the sensitivity and nonlinearity of the transducer signal may also be influenced by the choice of excitation signal.

Since a magnetoelastic transducer is a nonlinear device, its properties may vary with the level of the excitation. In this case it is advisable to regulate this level, in order to keep it constant with e.g. different cable impedances or different operating temperatures.

If the level of excitation is to be regulated, it is best to choose as excitation signal the signal that varies the least with the load. In this way the regulation of the excitation may be much slower than the time scale of the load changes, without affecting the signal output. Since the level of excitation is compensated for in the demodulation, the effect of different time scales for the excitation level regulation and the load will be very small.

Since the impedance of the transducer varies with the temperature, this may be used for temperature compensation. If temperature compensation is to be performed, it is best to choose the excitation signal that varies the least with the load. In this way it is possible to separate the time scales for the temperature measurement and the load measurement, by digitally filtering the temperature measurement. This result in less noise in the temperature compensated output.

One advantage of the proposed system for demodulating transducer signals is that it is only dependent on the properties of the measuring channels at the excitation frequency. This makes it cheaper to construct electronics units that are identical and stable with temperature and time.

This advantage can be further improved by using the same measuring channel to measure all signals. In this case the frequency response of the measuring channel will be completely cancelled by the division performed when computing the complex demodulated output and the complex impedance. This compensation also compensates for the gain error of the A/D-converters, which can be substantial.

If a faster update rate of the output signal is required, the same compensation is still possible by using one channel to measure the transducer output and another measuring channel to measure all signal, including the output signal. We can then compute a compensation factor that takes into account the differences in frequency response between the two measuring channels by computing the quotient between the Fourier component of the transducer output signal measured simultaneously by the two channels.

If the excitation frequency of the transducer is very high relative to the required output signal bandwidth, it may be preferable to sample the signal for several periods of the excitation in order to gather a sufficient number of samples.

In this case the number of periods and the number of samples should not have a common multiple, so that all samples gathered come from different parts of the signal to be measured.

The advantage of demodulating the output signal by computing its frequency response at the excitation frequency is strictly true only for the mathematical Fourier components, and if all systems are linear.

Computing an approximation to the mathematical Fourier component by means of sampling the signal and computing the sums according to (10), of course, introduces errors. First of all there are discretisation errors due to the sampling and integer arithmetic. These errors are minimized by using an A/D converter with high resolution, using higher precision numbers in the arithmetic and a large number of samples.

Secondly, sampling a continuous signal introduces aliasing in which signals with a higher frequency than the Nyquist frequency (which is one half the sampling frequency) are "folded" into the spectrum with frequencies below the Nyquist frequency. With a sampling frequency of 16 times the excitation frequency, the 9'th harmonic will contribute to the sampled Fourier component of the 7'th harmonic. The 11'th will contribute to the 5'th, etc.

Since the demodulation only depends on the Fourier components at the excitation frequency, errors due to aliasing will come from the signal spectrum around the 15'th and 17'th harmonics in this case. Since higher frequency components have lower amplitude, the errors due to aliasing will be very small if the sampling frequency is high enough. This is especially important if the excitation voltage is a switched DC voltage, since this signal has a very high frequency content.

Note that if the Fourier component is computed using an odd number of samples, the first order contribution from aliased harmonics will come from even harmonics. If the excitation signal is anti-symmetric, the excitation and the output signals will only contain odd harmonics. The major contribution will then be due to second order aliasing, i.e. harmonics around twice the sampling frequency. Anti-aliasing filters can therefore be made quite simple and have high cutoff frequencies, which makes them more stable at the excitation frequency.

The term comprises/comprising when used in this specification is taken to specify the presence of stated features, integers, steps or components. However, the term does not preclude the presence or addition of one or more additional features, integers, steps or components or groups thereof.

The invention claimed is:

1. A method for demodulating an output signal (y(t)) from a transducer (1) driven by an alternating excitation signal (u(t)) having an excitation frequency,
said transducer (1) amplitude-modulating said output signal (y(t)) based on a quantity to be measured, the method comprising:
receiving sampled values of the output signal from the transducer and sampled values of the excitation signal over at least one period of the excitation frequency,
computing a first complex valued quantity ($\overline{Y}$) including information on the amplitude and phase of the output signal at the excitation frequency based on said sampled values of the output signal from the transducer,
computing a second complex valued quantity ($\overline{U}, \overline{I}$) including information on the amplitude and phase of the excitation signal at the excitation frequency based on said sampled values of the excitation signal,
forming a complex valued output quotient between said first and second complex valued quantities, and
computing a demodulated transducer output signal ($O_d$) based on said output quotient.

2. The method according to claim 1, wherein the computation of said demodulated output signal comprises taking the real part of said output quotient.

3. The method according to claim 1, wherein the computation of said demodulated output signal comprises forming a nonlinear combination of the real and imaginary parts of said output quotient.

4. The method according to claim 1, wherein the computation of said first quantity comprises multiplying the sampled values of the output signal by a sinusoid ($w_1(t)$) oscillating at the excitation frequency, and summing the resulting products over at least one period of the excitation signal, thereby forming a real part of the first quantity, and multiplying the sampled values of the output signal by another sinusoid ($w_2(t)$) displaced by a phase angle of approximately $\pi/2$ with respect to the first sinusoid and oscillating at the excitation frequency, and summing the resulting products over at least one period of the excitation signal, thereby forming an imaginary part of the first quantity.

5. The method according to claim 1, wherein the computation of said second quantity comprises multiplying the sampled values of the excitation signal by a sinusoid ($w_1(t)$) oscillating at the excitation frequency, and summing the resulting products over at least one period of the excitation signal, thereby forming a real part of the second quantity, and multiplying the sampled values of the excitation signal by another sinusoid ($w_2(t)$) displaced by a phase angle of approximately $\pi/2$ with respect to the first sinusoid and oscillating at the excitation frequency, and summing the resulting products over at least one period of the excitation signal, thereby forming an imaginary part of the second quantity.

6. The method according to claim 1, wherein the computation of said first quantity ($\overline{Y}$) comprises calculating the Fourier Transform of the sampled values of the output signal, and based thereon extracting a coefficient corresponding to the excitation frequency, and the computation of said second quantity ($\overline{U}, \overline{I}$) comprises calculating the Fourier Transform of the sampled values of the excitation signal, and based thereon extracting a coefficient corresponding to the excitation frequency.

7. The method according to claim 1, wherein said sampled values of the excitation signal includes a first series of sampled values representing the current of excitation signal and a second series of sampled values representing the voltage of the excitation signal, and the method further comprising:
   computing said second complex valued quantity ($\overline{U}$) based on one of said series of sampled values,
   computing a third complex valued quantity ($\overline{I}$) including information on the amplitude and phase of the excitation current based on the other of said series of sampled values,
   forming a complex valued quotient $$\left(\frac{\overline{U}}{\overline{I}}\right)$$

between said second and third complex valued quantities,
   computing the impedance ($Z$) of the transducer based on said complex valued quotient, and
   performing a temperature compensation based on the computed impedance.

8. A computer program product directly loadable into the internal memory of a computer, comprising software for performing the steps of claim 1.

9. A computer readable medium having a program recorded thereon, where the program is to make a computer perform the steps of claim 1, when said program is run on the computer.

10. A device for demodulation of an output signal ($y(t)$) from a transducer (1) driven by an alternating excitation signal ($u(t)$) from an excitation unit (2) having an excitation frequency, said transducer (1) amplitude-modulating said output signal ($y(t)$) based on a quantity to be measured, the device comprises:
   a sampling unit (5,6,7) adapted to sample the output signal from the transducer and the output signal from the excitation unit (2) over at least one period of the excitation frequency, and
   a computation unit (8) adapted to
   compute a first complex valued quantity ($\overline{Y}$) including information on the amplitude and phase of the output signal at the excitation frequency based on sampled values of the output signal from the transducer,
   compute a second complex valued quantity ($\overline{U}, \overline{I}$) including information on the amplitude and phase of the excitation signal at the excitation frequency based on sampled values of the excitation signal,
   forming a complex valued output quotient between said first and second complex valued quantities, and
   compute a demodulated transducer output signal ($O_d$) based on said output quotient.

11. The device according to claim 10, wherein said computation unit (8) is adapted to take the real part of said output quotient and to compute the demodulated output signal based thereon.

12. The device according to claim 10, wherein said computation unit (8) is adapted to form a nonlinear combination of the real and imaginary parts of said output quotient and to compute the demodulated output signal based thereon.

13. The device according to claim 10, wherein said computation unit (8) is adapted to compute said first quantity ($\overline{Y}$) by multiplying the sampled values of the output signal by stored values from a sinusoid oscillating at the excitation frequency, and summing the resulting products over at least one period of the excitation signal, thereby forming a real part of the first quantity, and by multiplying the sampled values of the output signal by stored values from another sinusoid displaced by a phase angle of approximately $\pi/2$ with respect to the first sinusoid and oscillating at the excitation frequency, and summing the resulting products over at least one period of the excitation signal, thereby forming an imaginary part of the first quantity.

14. The device according to claim 10, wherein said computation unit (8) is adapted to compute said second quantity ($\overline{U}, \overline{I}$) by multiplying the sampled values of the excitation signal by stored values from a sinusoid oscillating at the excitation frequency, and summing the resulting products over at least one period of the excitation signal, thereby forming a real part of the second quantity, and by multiplying the sampled values of the excitation signal by stored values from another sinusoid displaced by a phase angle of approximately $\pi/2$ with respect to the first sinusoid and oscillating at the excitation frequency, and summing the resulting products over at least one period of the excitation signal, thereby forming an imaginary part of the second quantity.

15. The device according to claim 10, wherein said computation unit (8) is adapted to compute said second quantity ($\overline{U}, \overline{I}$) by calculating the Fourier Transform of the sampled values of the output signal, and based thereon extracting a coefficient corresponding to the excitation frequency, and to compute said second quantity comprises by calculating the Fourier Transform of the sampled values of the excitation signal, and based thereon extracting a coefficient corresponding to the excitation frequency.

16. The device according to claim 10, wherein said sampling unit (5,6,7) is adapted to produce a first series of sampled values representing the current of excitation signal and a second series of sampled values representing the voltage of the excitation signal, said computation unit (8) is adapted to compute said second complex valued quantity based on one of said series of sampled values and to compute a third complex valued quantity including information on the amplitude and phase of the excitation current based on the other of said series of sampled values, and the device further comprises a temperature compensating unit (16) adapted to form a complex valued quotient $$\left(\frac{U}{I}\right)$$

between said second and third complex valued quantities, to compute the impedance of the transducer based on said complex valued quotient between the excitation voltage and the current, and to perform a temperature compensation based on the computed impedance.

17. Use of the device according to claim 10 for demodulating a transducer adapted to measure force, stress or torque.

18. Use of the device according to claim 10 for demodulating a magnetoelastic transducer.

19. The device according to claim 11, wherein said computation unit (8) is adapted to form a nonlinear combination of the real and imaginary parts of said output quotient and to compute the demodulated output signal based thereon.

20. The device according to claim 19, wherein said computation unit (8) is adapted to compute said first quantity ($\overline{Y}$) by multiplying the sampled values of the output signal by stored values from a sinusoid oscillating at the excitation frequency, and summing the resulting products over at least one period of the excitation signal, thereby forming a real part of the first quantity, and by multiplying the sampled values of the output signal by stored values from another sinusoid displaced by a phase angle of approximately $\pi/2$ with respect to the first sinusoid and oscillating at the excitation frequency, and summing the resulting products over at least one period of the excitation signal, thereby forming an imaginary part of the first quantity.

* * * * *